United States Patent [19]
Shrivastava et al.

[11] Patent Number: 6,163,855
[45] Date of Patent: Dec. 19, 2000

[54] METHOD AND SYSTEM FOR REPLICATED AND CONSISTENT MODIFICATIONS IN A SERVER CLUSTER

[75] Inventors: Sunita Shrivastava, Redmond; Rod Gamache, Issaquah; John D. Vert, Seattle, all of Wash.

[73] Assignee: Microsoft Corporation, Redmond, Wash.

[21] Appl. No.: 09/062,359

[22] Filed: Apr. 17, 1998

[51] Int. Cl.[7] .................................................. G06F 11/00
[52] U.S. Cl. .......................................... 714/4; 395/200.38
[58] Field of Search .................................. 714/4, 2, 3, 7, 714/8, 9, 10, 12, 13, 16, 18, 25, 31, 39, 43; 395/575, 325, 600, 800, 200.68

[56] References Cited

U.S. PATENT DOCUMENTS

| | | | |
|---|---|---|---|
| 4,736,393 | 4/1988 | Grimes et al. | 375/107 |
| 5,341,372 | 8/1994 | Kirkham | 370/85.8 |
| 5,398,329 | 3/1995 | Hirata et al. | 395/575 |
| 5,416,777 | 5/1995 | Jirkham | 370/85.8 |
| 5,423,037 | 6/1995 | Hvasshovd | 395/600 |
| 5,434,865 | 7/1995 | Kirkham | 370/85.13 |
| 5,435,003 | 7/1995 | Chng et al. | 395/575 |
| 5,490,270 | 2/1996 | Devarakonda et al. | 395/600 |
| 5,537,532 | 7/1996 | Chng et al. | 395/182.02 |
| 5,737,601 | 4/1998 | Jain et al. | 395/617 |
| 5,754,877 | 5/1998 | Hagersten et al. | 395/800.29 |
| 5,805,839 | 9/1998 | Singhal | 395/292 |
| 5,806,075 | 9/1998 | Jain et al. | 707/201 |
| 5,815,649 | 9/1998 | Utter et al. | 395/112.04 |
| 5,982,747 | 11/1999 | Ramfelt et al. | 370/224 |
| 5,991,771 | 11/1999 | Falls et al. | 707/202 |
| 6,003,075 | 12/1999 | Arendt et al. | 709/221 |

OTHER PUBLICATIONS

Carr, Richard, "The Tandem Global Update Protocol," *Tandem Systems Review*, vol. 1, No. 2, 74–85 (1985).

Lamport, Leslie, *A Fast Mutual Exclusion Algorithm*, Digital Equipment Corporation, Oct. 31, 1986.

Lamport, Leslie, *The Part–Time parliament*, Digital Equipment Corporation, Sep. 1, 1989.

*Primary Examiner*—Nadeem Iqbal
*Attorney, Agent, or Firm*—Michalik & Wylie, PLLC

[57] ABSTRACT

A method and system for communicating modification information to servers in a server cluster. Local changes, such as modifications to a resource requested at one node, are associated into a single transaction. A master node, such as the node that owns the set of resources corresponding to the modifications in the transaction requests permission from a locker node to replicate the transaction. When permission to replicate the transaction is received from the locker node, the master node replicates the transaction by requesting each node in the cluster, one node at a time, to commit the transaction. Any node that does not commit the transaction is removed from the cluster, ensuring consistency of the cluster. Failure conditions of any node or nodes are also handled in a manner that ensures consistency.

19 Claims, 8 Drawing Sheets

METHOD AND SYSTEM FOR REPLICATED AND CONSISTENT MODIFICATIONS IN A SERVER CLUSTER

FIELD OF THE INVENTION

The invention relates generally to computer network servers, and more particularly to computer servers arranged in a server cluster.

BACKGROUND OF THE INVENTION

A server cluster is a group of at least two independent servers connected by a network and managed as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be quickly restarted on a surviving server, with no substantial reduction in service. Indeed, clients of a Windows NT cluster believe they are connecting with a single, physical system, but are actually connecting to a service which may be provided by one of several systems. To this end, clients create a TCP/IP session with a service in the cluster using a known IP address. This address appears to the cluster software as a resource in the same group (i.e., a collection of resources managed as a single unit) as the application providing the service. In the event of a failure the cluster service "moves" the entire group to another system.

Other benefits include the ability for administrators to inspect the status of cluster resources, and accordingly balance workloads among different servers in the cluster to improve performance. Dynamic load balancing is also available. Such manageability also provides administrators with the ability to update one server in a cluster without taking important data and applications offline. As can be appreciated, server clusters are used in critical database management, file and intranet data sharing, messaging, general business applications and the like.

While clustering is thus desirable in many situations, problems arise if the servers (nodes) of the cluster become inconsistent with one another with respect to certain persistent cluster information. For example, memory state information, properties of the cluster or its resources and/or the state and existence of components in the cluster need to be consistent among the cluster's nodes. When such information is modified, the modifications occur on a local node and are often multiple in nature, e.g., an update of a registry, an update of data on a disk and an update of the state of a resource may take place at essentially the same time as a result of some modification of a resource or set of resources. Accordingly, to remain consistent, each time a modification of such local data occurs, some mechanism has to provide appropriate modification information to the other nodes so that they can update their local databases.

However, different nodes can fail at different times, potentially making some nodes inconsistent. For example, only part of a multiple update may be processed by a node before that node fails. Moreover, if one of the nodes does not receive or will not accept the change, then that node will be inconsistent with the rest of the cluster. As a result, simply broadcasting individual change information to each of the nodes and hoping that each node receives and processes the change is inadequate. In sum, there has heretofore been no adequate way in which to consistently replicate multiple associated modifications to the nodes of a server cluster.

SUMMARY OF THE INVENTION

Accordingly, the present invention provides an improved method and system for replicating modifications to nodes in a cluster. The system and method of the present invention utilize a global update mechanism to make multiple persistent changes on each node in the cluster in an atomic, consistent isolated and durable manner, whereby either the persistent changes occur on each of the nodes in the cluster, or no persistent changes occur on any node in the cluster. The system and method operate regardless of node or other failures to ensure that no nodes in the cluster are inconsistent with others.

Briefly, the present invention provides a method and system for communicating modification information to servers in a server cluster. A plurality of local changes at one node are associated into a single transaction. A master node, such as the node that owns the set of resources corresponding to the modifications in the transaction, requests permission from a locker node to replicate the transaction. When permission to replicate the transaction is received from the locker node, the master node replicates the transaction by requesting each node in the cluster, one node at a time, to commit the transaction. Any node that does not commit the transaction is excluded from the cluster, ensuring consistency of the cluster. Other failure conditions of any node or nodes are also handled in a manner that ensures consistency.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
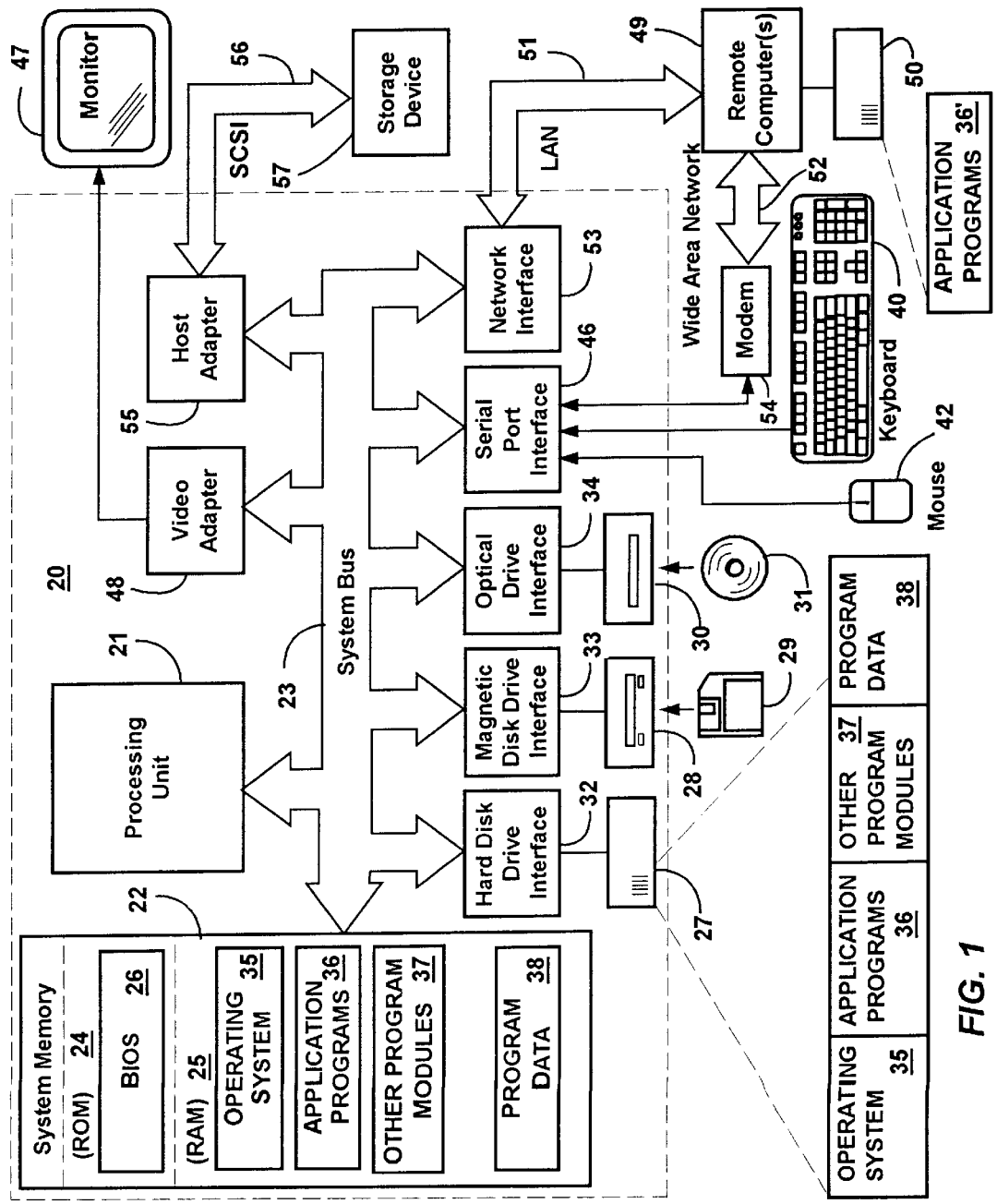
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a system (node) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
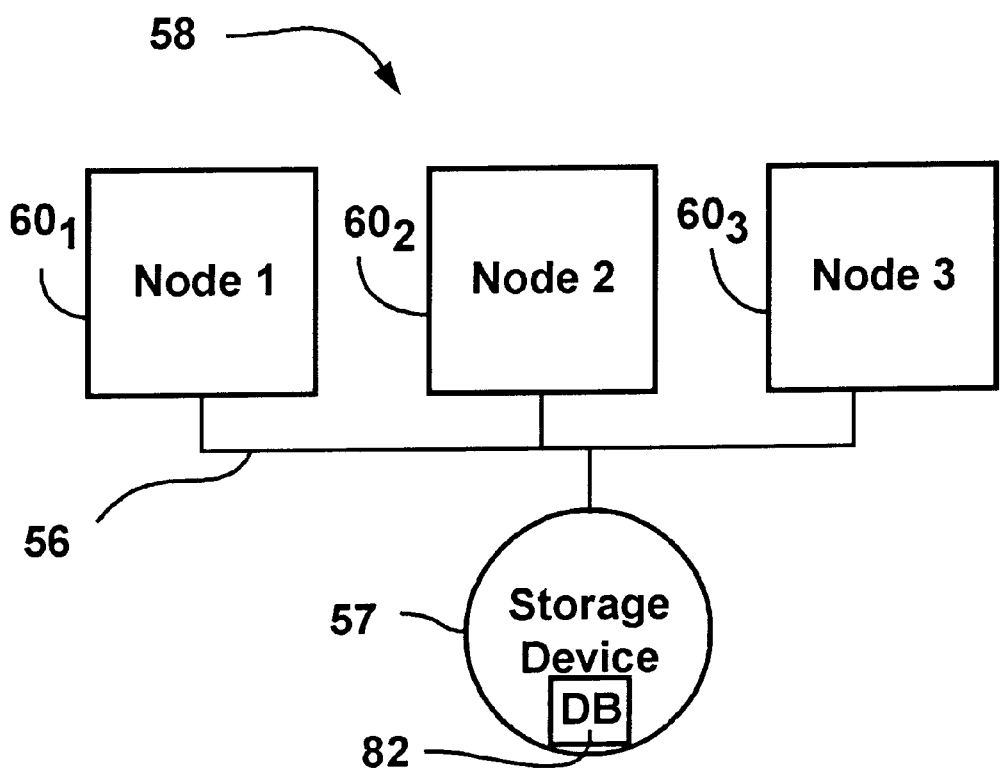
FIG. 2 is a block diagram representing a server cluster.

The preferred system 20 further includes a host adapter 55 or the like which connects the system bus 23 to a SCSI (Small Computer Standard Interface) bus 56 for communicating with at least one persistent memory storage device 57, known as a quorum device. Of course, other ways of connecting cluster systems to a storage device, including Fibre Channel, are equivalent. In any event, as shown in FIG. 2, the computer system 20 may comprise the system $60_1$, while one of the remote computers 49 may be similarly connected to the SCSI bus 56 and comprise the system $60_2$. Note that multiple storage devices may be connected to the SCSI bus 56 (or the like) such as for purposes of resilience to disk failure through the use of multiple disks, i.e., software and/or hardware-based redundant arrays of inexpensive or independent disks (RAID).

To create a new cluster, a system administrator runs a cluster installation utility on a system that then becomes a first member of the cluster 58. For a new cluster 58, a database is created and the initial cluster member information is added thereto. The administrator then configures any devices that are to be managed by the cluster software. At this time, a cluster exists having a single member, after which the installation procedure is run on each of the other members of the cluster. For each added member, the name of the existing cluster is entered and the new system receives a copy of the existing cluster database.

Figure 3:
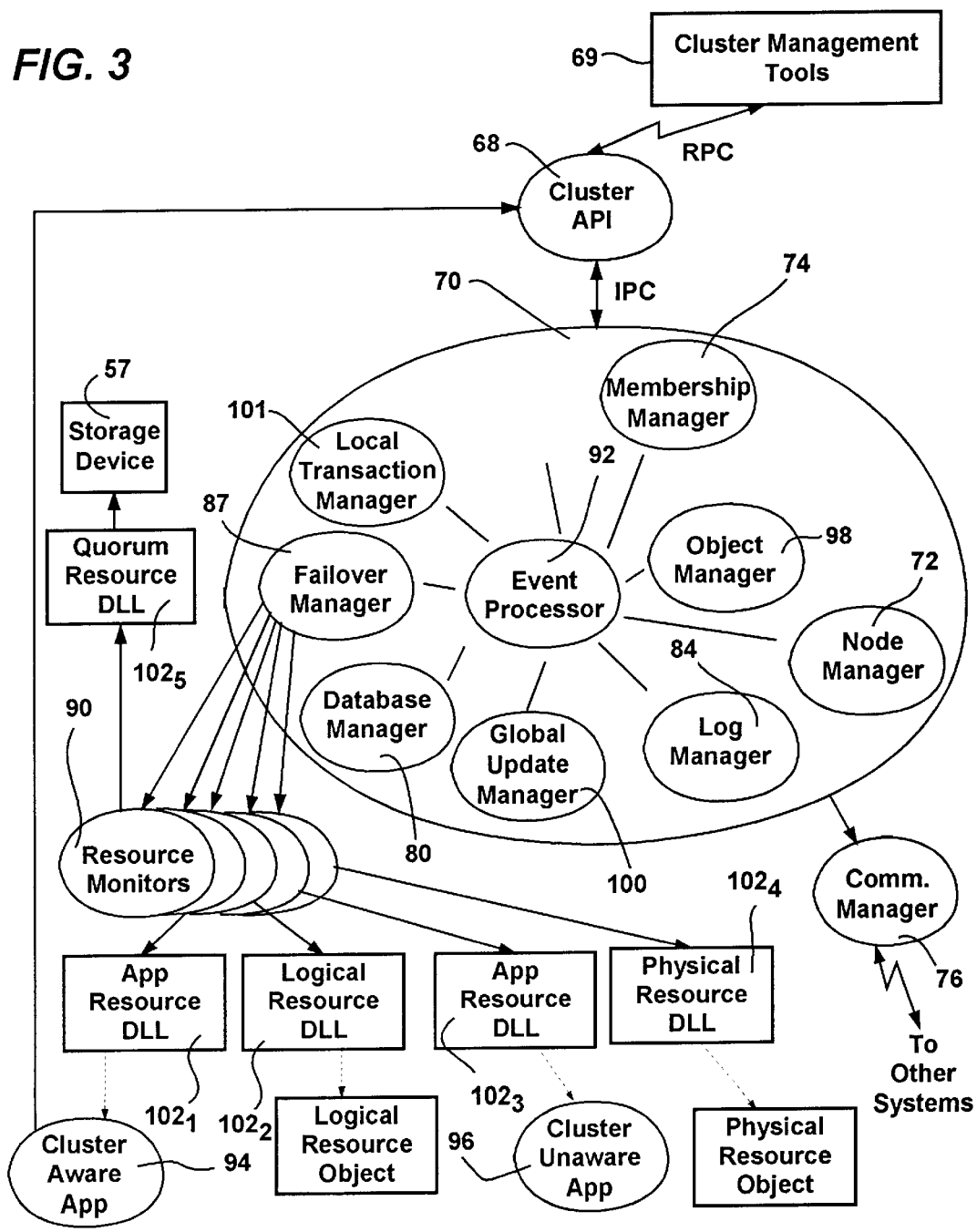
FIG. 3 is a representation of various components within the clustering service of a system for implementing the present invention.

As shown in FIG. 3, to accomplish cluster creation and to perform other administration of cluster resources, systems, and the cluster itself, a cluster application programming interface (API) 68 is provided. Applications and cluster management administration tools 69 call various interfaces in the API 68 using remote procedure calls (RPC), whether running in the cluster or on an external system. The various interfaces of the API 68 may be considered as being categorized by their association with a particular cluster component, i.e., systems, resources and the cluster itself.

Cluster Service Components

FIG. 3 provides a representation of the cluster service components and their general relationships in a single system (e.g., $60_1$) of a Windows NT cluster. A cluster service 70 controls the cluster operation on a cluster system 58, and is preferably implemented as a Windows NT service. The cluster service 70 includes a node manager 72, which manages node configuration information and network configuration information (e.g., the paths between nodes). The node manager 72 operates in conjunction with a membership manager 74, which runs the protocols that determine what cluster membership is when a change (e.g., regroup) occurs. A communications manager 76 (kernel driver) manages communications with other systems of the cluster 58 via one or more network paths. The communications manager 76 sends periodic messages, called heartbeats, to counterpart components on the other systems of the cluster 58 to provide a mechanism for detecting that the communications path is good and that the other systems are operational. Through the communications manager 76, the cluster service 70 is essentially in constant communication with the other systems of the cluster. In a small cluster, communication is fully connected, i.e., all systems of the cluster 58 are in direct communication with all other systems.

Systems (e.g., $60_1$–$60_3$) in the cluster 58 have the same view of cluster membership, and in the event that one system detects a communication failure with another system, the detecting system broadcasts a message to the cluster 58 causing other members to verify their view of the current cluster membership. This is known as a regroup event, during which writes to potentially shared devices are disabled until the membership has stabilized. If a system does not respond, it is removed from the cluster 58 and its active groups are failed over ("pulled") to one or more active systems. Note that the failure of a cluster service 70 also causes its locally managed resources to fail.

The cluster service 70 also includes a configuration database Manager 80 which implements the functions that maintain a cluster configuration database on a local device such as a disk and/or memory, and a configuration database 82 (FIG. 2) on the common persistent storage devices, (e.g., storage device 57). The database maintains information about the physical and logical entities in the cluster 58, including the cluster itself, systems, resource types, quorum resource configuration, network configuration, groups, and resources. Note that both persistent and volatile information may be used to track the current and desired state of the cluster. The database manager 80 cooperates with counterpart database managers of systems in the cluster 58 to maintain configuration information consistently across the cluster 58. As described in more detail below, global updates are used to ensure the consistency of the cluster database in each of the systems. The configuration database manager 80 also provides an interface to the configuration database 82 for use by the other cluster service 70 components. A logging manager 84 provides a facility that works with the database manager 80 to maintain cluster state information across a situation in which a cluster shuts down and a new cluster is later formed with no members common to the previous cluster, known as a temporal partition.

A failover manager 87 makes resource/group management decisions and initiates appropriate actions, such as startup, restart and failover. The failover manager 87 is responsible for stopping and starting the system's resources, managing resource dependencies, and for initiating failover of groups. A group is a unit of failover. A collection of related resources are organized into a group to allow an administrator to manage them as a single unit. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree. Group operations performed on a group affect all resources contained within that group. Dependency trees are described in more detail in U.S. patent application Ser. No. 08/963,049 entitled *"Method and System for Resource Monitoring of Disparate Resources in a Server Cluster,"* assigned to the same assignee as the present invention.

The failover manager 87 components receives resource and system state information from at least one resource monitor 90 and the node manager 72, for example, to make decisions about groups. The failover manager 87 is responsible for deciding which systems in the cluster should "own" which groups. Those systems that own individual groups turn control of the resources within the group over to their respective failover managers 87.

An event processor 92 connects all of the components of the cluster service 70 by providing a mechanism for event notifications. The event processor 92 propagates events to applications (e.g., 94 and 96) and to and from the components within the cluster service 70. An object manager 98 maintains various cluster objects, and a global update manager 100 operates to provide a global update service that is used by other components within the Cluster Service 70.

The global update protocol (GLUP) is used by the global update manager 100 to broadcast updates to each node in a cluster. GLUP generally comprises a standard global update message format, state information maintained in each node, and a set of rules that specify how global update should be processed and what steps should be taken when failures occur.

In general, according to the GLUP protocol, one node (e.g. $60_1$) serves as a "locker" node. The locker node $60_1$ ensures that only one global update is in progress at any given time. A unique number typically identifies each node in the cluster, and thus a simple way to select the locker node $60_1$ is to choose the node having the lowest number as the locker node, e.g., the node that initially forms the cluster. If the locker node $60_1$ ever fails, then the node having the next lowest GLUP number (e.g., the first other node $60_2$ that joined the cluster) assumes responsibility as the locker node.

With GLUP, a node (e.g., $60_2$) wishing to send an update to other nodes first sends a request to the locker node $60_1$. When any preceding updates are complete, the locker node $60_1$ gives permission for this "sender" node $60_2$ to broadcast its update to the other nodes in the system. In accordance with GLUP, the sender node sends the updates, one at a time, to the other nodes in a predetermined GLUP order that is ordinarily based on the unique number assigned to each node.

GLUP handles node failures without compromising consistency. If the sender node $60_2$ fails while an update is in progress, the locker node $60_1$ recognizes the failure and re-sends the update to the other nodes (e.g. $60_3$) in the system. The update is uniquely tagged so that nodes which have already received the update simply ignore the re-sent update. Alternatively, if the locker node $60_1$ fails, a new locker node (the node $60_2$) is chosen in GLUP succession order. Because the locker node $60_1$ may have failed while an update was in progress, the new locker node $60_2$ reconstructs and re-sends the last update it received, whereby other nodes accept and process or ignore the update depending on whether they previously received it. Lastly, if another node (e.g., $60_3$) fails to properly acknowledge an update, GLUP removes the failing node from the cluster since that node is inconsistent with the other nodes in the cluster.

A more detailed discussion of the GLUP protocol is described in the publication "Tandem Systems Review" Volume 1, Number 2, June, 1985 pp. 74–84.

In accordance with one aspect of the present invention, persistent multiple updates to a local node are treated as a single transaction that is replicated via GLUP across the nodes of a cluster. This ensures that multiple updates are replicated in an atomic, consistent, isolated and durable manner. By way of example, as a result of a modification to a set of resources, a local machine may wish to perform three sub-operations, e.g., update a registry, update data on a disk and update the state of the resource. These updates are handled as a single transaction by combining them into a single global update message, whereby via GLUP, all of these sub-operations are committed together on every node in the cluster else none of the sub-operations are committed.

A resource monitor 90 runs in one or more processes that may be part of the cluster service 70, but are shown herein as being separate from the cluster service 70 and communicating therewith via Remote Procedure Calls (RPC) or the like. The resource monitor 90 monitors the health of one or more resources (e.g., $102_1$–$102_5$) via callbacks thereto. The monitoring and general operation of resources is described in more detail in U.S. patent application Ser. No. 08/963,049, hereby incorporated by reference herein in its entirety.

The resources (e.g., $102_1$–$102_5$) are implemented as one or more Dynamically Linked Libraries (DLLs) loaded into the address space of the Resource Monitor 102. For example, resource DLLs may include physical disk, logical volume (consisting of one or more physical disks), file and print shares, network addresses and names, generic service or application, and Internet Server service DLLs. Certain resources (e.g., provided by a single source) may be run in a single process, while other resources may be run in at least one other process. The resources $102_1$–$102_5$ run in the system account and are considered privileged code. Resources $102_1$–$102_5$ may be defined to run in separate processes, created by the Cluster Service 70 when creating resources.

Resources expose interfaces and properties to the cluster service 70, and may depend on other resources, with no circular dependencies allowed. If a resource does depend on other resources, the resource is brought online after the resources on which it depends are already online, and is taken offline before those resources. Moreover, each resource has an associated list of systems in the cluster on which this resource may execute. For example, a disk resource may only be hosted on systems that are physically connected to the disk. Also associated with each resource is a local restart policy, defining the desired action in the event that the resource cannot continue on the current system.

Systems in the cluster need to maintain a consistent view of time. One of the components, known as the time source and selected by the administrator, includes a resource that implements the time service. Note that the time service, which maintains consistent time within the cluster 58, is implemented as a resource rather than as part of the cluster service 70 itself.

From the point of view of other systems in the cluster 58 and management interfaces, systems in the cluster 58 may be in one of three distinct states, offline, online or paused. These states are visible to other systems in the cluster 58, and thus may be considered the state of the cluster service 70. When offline, a system is not a fully active member of the cluster 58. The system and its cluster service 70 may or may not be running. When online, a system is a fully active member of the cluster 58, and honors cluster database updates, can contribute one or more votes to a quorum algorithm, maintains heartbeats, and can own and run groups. Lastly, a paused system is a fully active member of the cluster 58, and thus honors cluster database update, can contribute votes to a quorum algorithm, and maintain heartbeats. Online and paused are treated as equivalent states by most of the cluster software, however, a system that is in the paused state cannot honor requests to take ownership of groups. The paused state is provided to allow certain maintenance to be performed.

Note that after initialization is complete, the external state of the system is offline. The node manager 72 begins the process of joining or forming a cluster. To join a cluster, following the restart of a system, the cluster service 70 is started automatically. The system configures and mounts local, non-shared devices. Cluster-wide devices are left offline while booting, because they may be in use by another node. The system tries to communicate over the network with the last known members of the cluster 58. When the system discovers any member of the cluster, it performs an authentication sequence wherein the existing cluster system authenticates the newcomer and returns a status of success if authenticated, or fails the request if not. For example, if a system is not recognized as a member or its credentials are invalid, then the request to join the cluster is refused. If successful, the database in the arriving node is examined, and if it is out of date, it is sent an updated copy. The joining system uses this shared database to find shared resources and to bring them online as needed, and also to find other cluster members.

If a cluster is not found during the discovery process, a system will attempt to form its own cluster. In general, to form a cluster, the system gains exclusive access to a special resource known as a quorum resource (quorum device). The quorum resource is used as a tie-breaker when booting a cluster and also to protect against more than one node forming its own cluster if communication fails in a multiple node cluster. The quorum resource is often (but not necessarily) a disk that maintains the state of the cluster, which a node arbitrates for and needs possession of before it can form a cluster. A quorum resource offers a method for arbitrating a quorum resource object, typically by challenging (or defending) for an exclusive reservation of a storage device (e.g., 57 of FIG. 2) such as a disk that ordinarily stores log data for the cluster. A method for releasing an exclusive reservation may also be provided. The general operation of quorum resources including arbitration and exclusive possession of the quorum resource is described in more detail in U.S. patent application Ser. No. 08/963,050 entitled "*Method and System for Quorum Resource Arbitration in a Server Cluster*," assigned to the same assignee and hereby incorporated by reference herein in its entirety.

When leaving a cluster, a cluster member will send a ClusterExit message to all other members in the cluster, notifying them of its intent to leave the cluster. The exiting cluster member does not wait for any responses and immediately proceeds to shutdown all resources and close all connections managed by the cluster software. Sending a message to the other systems in the cluster when leaving saves the other systems from discovering the absence by a time-out operation.

Once online, a system can have groups thereon. A group can be "owned" by only one system at a time, and the individual resources within a group are present on the system which currently owns the Group. As a result, at any given instant, different resources within the same group cannot be owned by different systems across the cluster. Groups can be failed over or moved from one system to another as atomic units. Each group has a cluster-wide policy associated therewith comprising an ordered list of owners. A group fails over to systems in the listed order.

For example, if a resource (e.g., an application) fails, the failover manager 87 may choose to restart the resource, or to take the resource offline along with any resources dependent thereon. If the failover manager 87 takes the resource offline, the group is restarted on another system in the cluster, known as pushing the group to another system. A cluster administrator may also manually initiate such a group transfer. Both situations are similar, except that resources are gracefully shutdown for a manually initiated failover, while they are forcefully shut down in the failure case.

When an entire system in the cluster fails, its groups are pulled from the failed system to another system. This process is similar to pushing a group, but without the shutdown phase on the failed system. To determine what groups were running on the failed system, the systems maintain group information on each node of the cluster in a database to track which systems own which groups. To determine which system should take ownership of which groups, those systems capable of hosting the groups negotiate among themselves for ownership, based on system capabilities, current load, application feedback and/or the group's system preference list. Once negotiation of a group is complete, all members of the cluster update their databases to properly reflect which systems own which groups.

When a previously failed system comes back online, the failover manager 87 decides whether to move some groups back to that system, in an action referred to as failback. To automatically failback, groups require a defined preferred owner. Groups for which the newly online system is the preferred owner are pushed from the current owner to the new system. Protection, in the form of a timing window, is included to control when the failback occurs.

Replicated and Consistent Modifications

As described above, multiple modification updates are treated as a transaction, whereby either all such related modifications are committed together or none are committed. To this end, if a transaction is committed by a node, the other nodes in the system either commit the transaction or are excluded from the cluster. This ensures consistency, as either a node is consistent with the other nodes of the cluster or it has to leave the cluster and rejoin. As described above, rejoining a cluster includes receiving an updated copy of the cluster database (if the joining node's database is inconsistent), resulting in the rejoining node becoming consistent.

To prevent multiple nodes from simultaneously modifying a set of resources or group, the preferred embodiment uses a single-master distributed locking protocol, however, those skilled in the art will recognize that any distributed locking protocol could be used. Within this scheme, the node issuing a transaction obtains permission to start a transaction from the locker node. Thus, a "requester" node that wishes to replicate modifications made to some set of resources does so only after receiving permission from the locker node. Preferably, the requestor node is the node that owns a resource or group (as described above) on which the transaction is being requested. Of course, other mechanisms for determining which node will be a master for a given transaction are feasible. In any event, serialization is achieved by forwarding all requests through the locker node. The single locker node thus ensures isolated operation.

Figure 4:
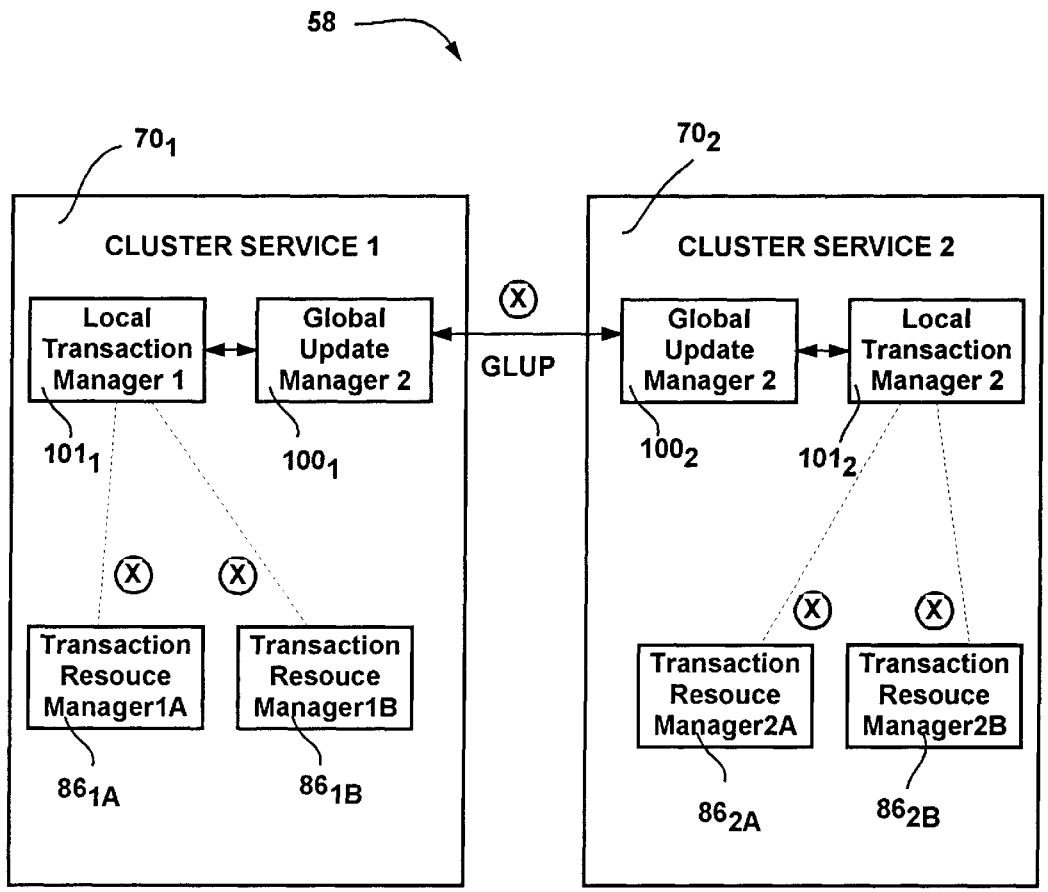
FIG. 4 is a representation of the components in two nodes for locally committing transactions.

The execution of the transaction on each node in the cluster is a local transaction. Therefore the coordinator of the transaction request is known as a Local Transaction Manager 101, as shown in FIGS. 3 and 4. Each local Transaction Manager1 (e.g., 101$_1$ and 101$_2$) are invoked by a handler of the component making the update. For example, if the Local Transaction Manager1 is in the master node, i.e., the Local Transaction Manager1 is the master of a transaction X (FIG. 4), then the transaction X is started by Local Transaction Manager1 indirectly coordinating with Local Transaction Manager2 via a handler via GLUP. Next, the Local Transaction Manager1 performs the transaction X locally by coordinating the operation across the Resource Manager1A (86$_{1A}$) and Resource Manager1B (86$_{1B}$) involved in a transaction.

After performing the transaction, the transaction request is forwarded to Local Transaction Manager2 via GLUP. The Local Transaction Manager2 next performs the transaction X across Resource Manager2A and Resource Manager2B. When the status of the Local Transaction Manager2 reaches the Local Transaction Manager1, Local Transaction Manager1 then informs the locker node that the replicated operation is complete. In keeping with the invention, if the status returned by Local Transaction Manager2 indicates a failure to perform the transaction, then GLUP is responsible for ensuring that the system running the Local Transaction Manager2 is removed from the cluster, since it is no longer consistent with the master node.

Note that if the Local Transaction Manager1 on the master node cannot perform the requested transaction X, then the originating request is failed immediately and appropriate status is returned to the requestor node. In this case, the transaction request is terminated immediately and no other node in the cluster is informed of the request, whereby the cluster remains consistent.

Figure 5:
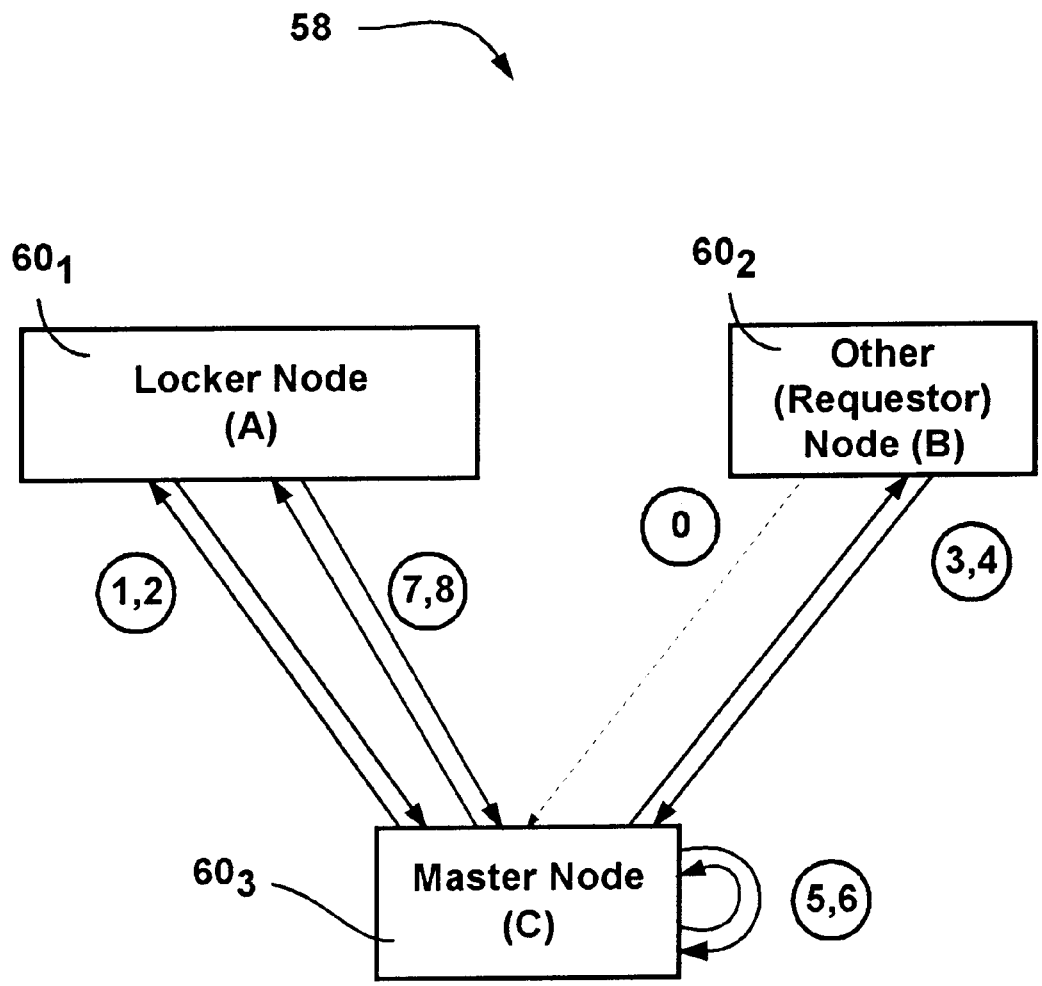
FIG. 5 is a block diagram representing a three-node cluster wherein a transaction is replicated to the nodes in accordance with one aspect of the present invention.

Turning to an explanation of the operation of the present invention, FIG. 5 represents a three-node cluster in which a transaction is to be replicated. In the following example, in FIG. 5, the node 60$_2$ (the "other" node) is the requester node that desires to replicate a transaction on a set of resources owned by the node 60$_3$. Thus, the node 60$_3$ becomes the master node for this transaction. Also, the node 60$_1$ is the locker node. As can be appreciated, for a given transaction, any node or nodes may operate as the master or requester node, e.g., the locker node may also be the requestor node and/or master node for a given transaction.

Figure 6:
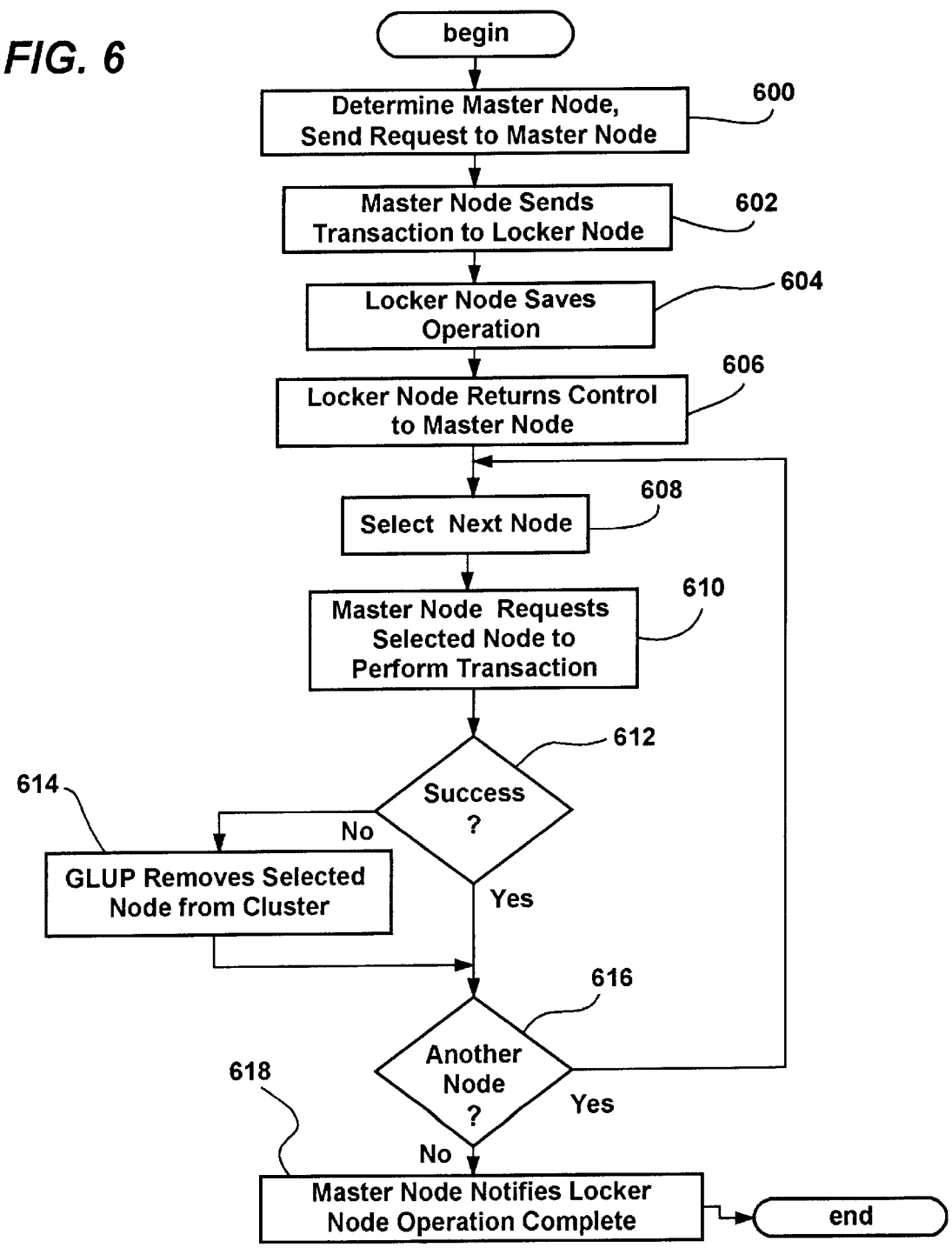
FIG. 6 is a flow diagram generally representing the steps taken to replicate a transaction to nodes of a multiple node cluster.

FIG. 6 is a flow diagram representing the general steps taken in replicating a transaction under typical circumstances. First, at step 600, the requester (other) node 60$_2$ determines which node is the master node, which in the present example is the node 60$_3$. As also shown in step 600, after the master node is determined to be the node 60$_3$, the requestor node 60$_2$ forwards the transaction request to the master node 60$_3$. In FIG. 5, this is represented by the dashed line labeled "0," wherein a dashed line is used to represent this operation because any of the three nodes may originate such a transaction request. Next, at step 602, the master node 60$_3$ forwards the transaction request to the GLUP locker node 60$_1$, (represented in FIG. 5 as the line corresponding to the "1" in the "1,2" pair of lines). The locker node 60$_1$ queues this operation for replicating to other nodes after any previously-received updates have been broadcast. As can be readily appreciated, in this manner the locker node $60_1$ thus ensures that only one global update is in progress at any one time.

Some time later when it is this transaction's turn for replication, steps 604–606 are executed, whereby the locker node $60_1$ saves the transaction in a GLUP storage, and permission to replicate is granted as control is returned to the master node $60_3$ for replicating the transaction to the other nodes. This operation is additionally represented in FIG. 5 as the line corresponding to "2." At this time, the locker node $60_1$ commits the transaction to its local database.

At step 608, the master node $60_3$ selects a node for replicating the transaction thereto. In accordance with GLUP, the node is the node $60_2$, selected in GLUP order (not including the locker node $60_1$ which already has the transaction). Then at step 610, (and as additionally represented by "3" in FIG. 5), the master node requests the selected node $60_2$ to commit the transaction. As described above, this is accomplished as the local transaction manager of the master node $60_3$ makes the request via GLUP to the local transaction manager of the selected node $60_2$. If the request is successfully processed, e.g., as represented by the "4" in FIG. 5 and the evaluation at step 612, the master node $60_3$ selects the next node for committing the transaction by repeating steps 608–612. Conversely, if the request fails, at step 614, GLUP removes the node $60_3$ from the cluster 58 to ensure consistency. In any event, in the present example, the master node selects itself next at step 608, as additionally represented by the "5,6" pair in FIG. 5.

Lastly, when the transaction has been replicated to all (remaining) nodes in the cluster, (step 616), at step 618 the master node $60_3$ sends a message to the locker node $60_1$ to inform the locker node $60_1$ that the operation is complete ("7,8" of FIG. 5). At this time, all nodes have either committed the transaction or have been removed from the cluster.

Figure 7:
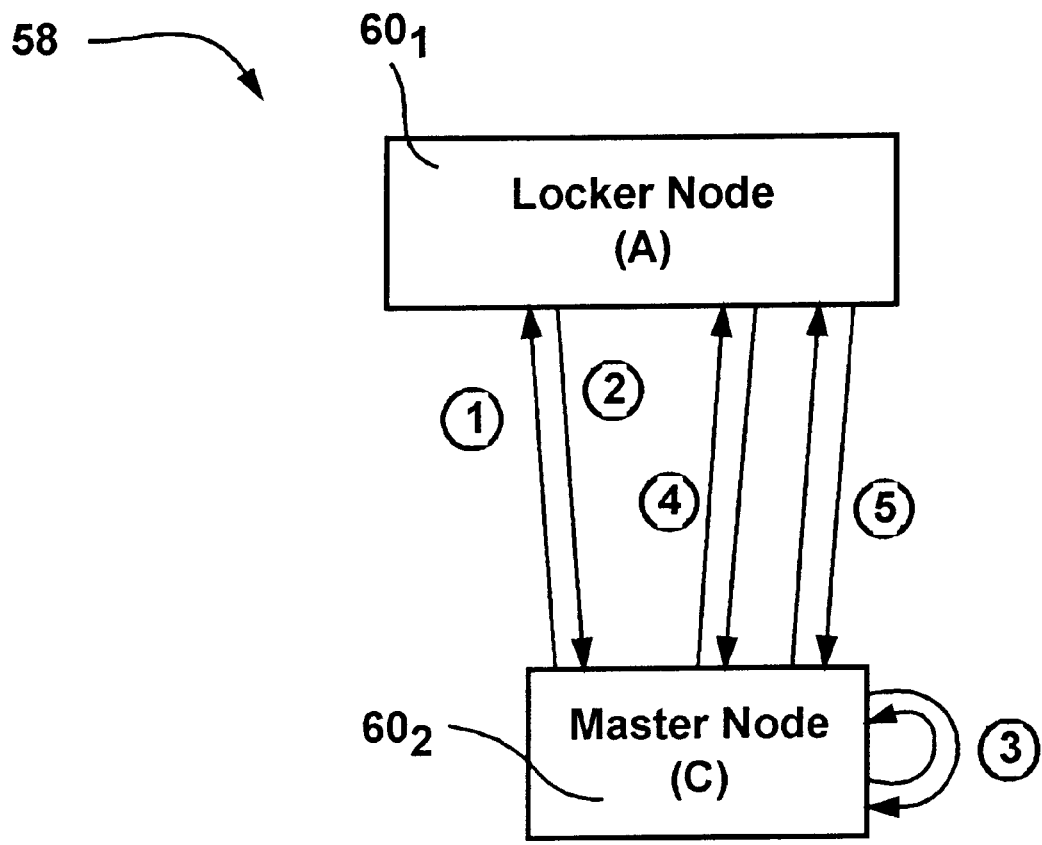
FIG. 7 is a block diagram representing the flow of control in a two-node cluster wherein a transaction is replicated to the nodes in accordance with one aspect of the present invention.
Figure 8:
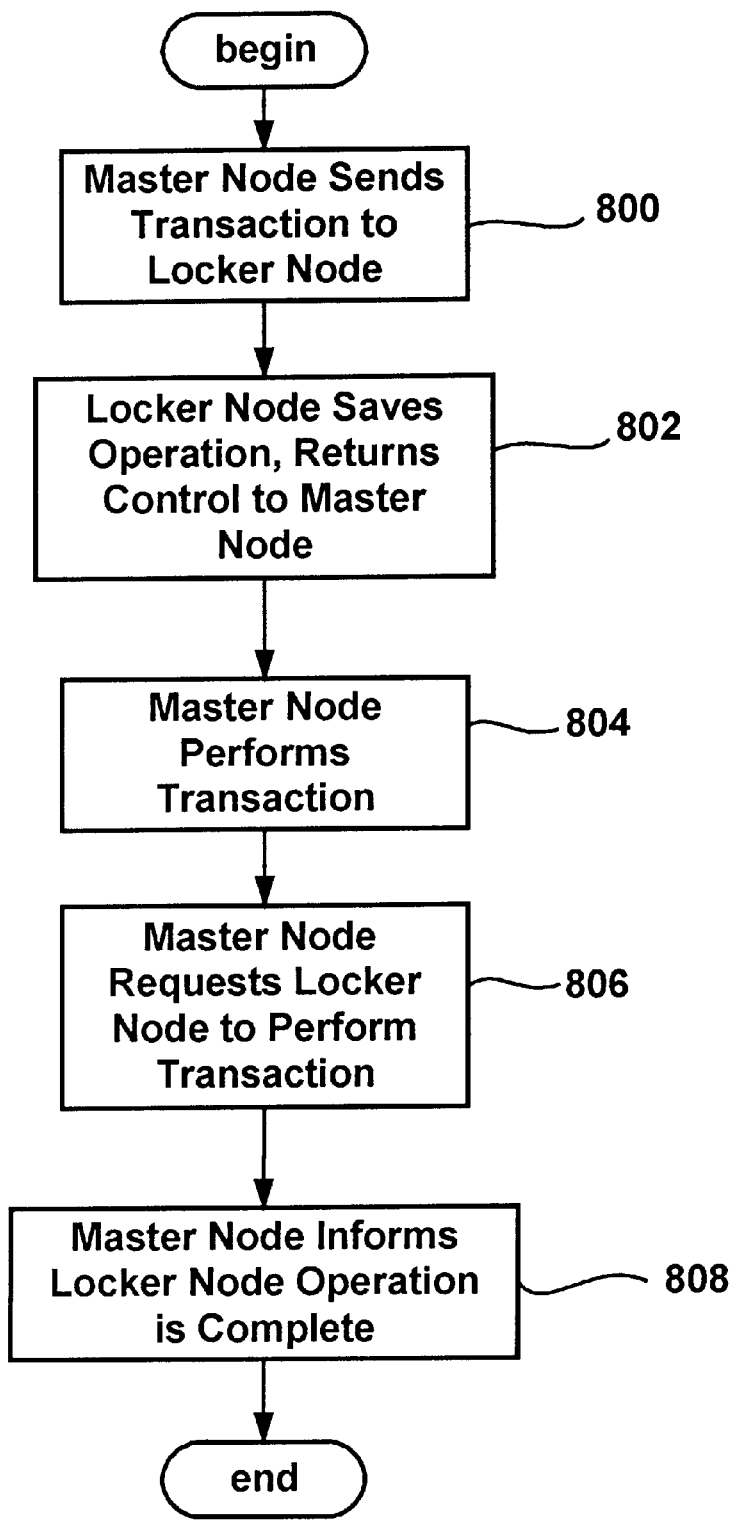
FIG. 8 is a flow diagram generally representing the steps taken to replicate a transaction in a two-node cluster wherein the master node and locker nodes are separate nodes.

The invention will now be described with respect to a two-node system wherein the locker node $60_1$ and master node $60_2$ are separate systems. As can be appreciated, if the locker node is the master node for a given transaction, the flow of control simply stays with this same node. In any event, FIG. 7 shows the flow of control in the two-node cluster, while FIG. 8 is a flow diagram describing the steps taken to replicate a transaction.

At step 800, the master node $60_2$ sends the transaction request to the GLUP locker node $60_1$ to request the replicated operation. Then, at step 802, when the locker node $60_1$ can begin the replicated operation, the locker node $60_1$ saves the requested operation and returns control to the master node $60_2$. At step 804, the master node $60_2$ performs the transaction. Next, at step 806, the master node 602, via GLUP, requests the locker node $60_1$ to perform the same transaction. Lastly, at step 808, the master node $60_2$ informs the locker node $60_1$ that the operation is complete.

If a failure occurs, the transaction is either performed atomically and consistently on the remaining nodes of the cluster, or it is not performed on any node in the cluster (which is still atomic and consistent). More particularly, if a failure occurs on the master node $60_2$ at step 800, then no node in the cluster knows about the transaction and the cluster is still consistent. The transaction is failed, and if the requester node was the locker node $60_1$, a failed status is returned to the requester node. Alternatively, if a failure occurred on the locker node $60_1$ at step 800, then in accordance with GLUP, the other node in cluster (which is the master node $60_2$) takes over the locker responsibility and either completes the transaction itself, or if already complete, does nothing. The sole surviving node represents the cluster and, of course, is consistent.

If a failure occurs on the master node $60_2$ at step 802, then if the master node $60_2$ has begun the replicated operation, the locker node $60_1$ simply completes the transaction by requesting itself to perform the transaction. Note that in the event that the replicated operation was not started, no node knows about the transaction, so the cluster (consisting solely of the locker node $60_1$) is still consistent. Alternatively, if a failure occurs on the locker node $60_1$, it is the same as a failure during step 800, i.e., the master node $60_2$ is the sole surviving node, assumes the locker responsibility, and commits the transaction.

If a failure occurs on the master node $60_2$ at steps 804, 806 or 808, the locker node $60_1$ knows about the transaction and ensures that the transaction is applied on the one surviving node in the cluster, i.e., itself. Similarly, if a failure occurs on the locker node $60_1$ at steps 804, 806 or 808, then the master node $60_2$ assumes responsibility as the locker node and either performs the transaction, if not already done, or dismisses the transaction as completed.

As can be appreciated, in accordance with one aspect of the present invention, in all cases the state of the cluster remains consistent and the operation is either performed everywhere or nowhere.

As can be seen from the foregoing detailed description, there is provided an improved method and system for replicating modifications to nodes in a cluster. The system and method of the present invention utilizes a global update mechanism to make multiple persistent changes on each node in the cluster in an atomic, consistent, isolated and durable manner, whereby either the persistent changes occur on each of the nodes in the cluster, or no persistent changes occur on any node in the cluster. The system and method operate regardless of node or other failures to ensure that no nodes in the cluster are inconsistent with others. Moreover, the system and method ensure that no two nodes may simultaneously attempt to change the state of a resource to inconsistent states.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of communicating modification information to servers in a server cluster, comprising associating a plurality of local changes at one node into a transaction, requesting permission from a locker node to replicate the transaction, receiving permission from the locker node to replicate the transaction, and replicating the transaction by requesting each node in the cluster to commit the transaction, wherein any node that does not commit the transaction is excluded from the cluster.

2. The method of claim 1 wherein the step of replicating the transaction includes the steps of replicating the transaction to each of the nodes one node at a time.

3. The method of claim 2 wherein the transaction is replicated to each of the nodes in a predetermined replication order.

4. The method of claim 1 further comprising the steps of detecting a failure of the locker node, and selecting another node in the cluster as a new locker node.

5. The method of claim 1 further comprising the steps of determining a master node corresponding to the changes, requesting the master node to replicate the transaction, detecting a failure of the master node, and selecting another node in the cluster to replicate the changes.

6. The method of claim 5 wherein the step of selecting another node in the cluster comprises the step of selecting the locker node.

7. In a server cluster of at least two nodes linked together for communication by a communication mechanism, a system for communicating modification information to each of the nodes of the cluster, comprising, a locker node for receiving requests to broadcast global updates and for granting permission to broadcast global updates, a master node, the master node associated with a transaction including information of at least one modification, the master node requesting and receiving permission from the locker node to replicate the transaction, the master node communicating the transaction via the communication mechanism to each other node of the cluster, and each node of the cluster committing the transaction or leaving the cluster.

8. The system of claim 7 wherein the locker node and the master node are the same node of the cluster.

9. The system of claim 7 wherein the locker node and the master node are separate nodes of the cluster communicating via the communication mechanism.

10. The system of claim 9 wherein only the locker node and the master node are in the cluster.

11. The system of claim 7 wherein the master node includes means for communicating the transaction to each other node in a sequence.

12. The system of claim 7 further comprising means for detecting a failure of the locker node, and means for selecting another node in the cluster as a new locker node.

13. The system of claim 7 further comprising means for detecting a failure of the master node, and means for selecting another node in the cluster to communicate the transaction to each other node.

14. The system of claim 7 wherein each node includes a local database for committing the transaction thereto.

15. In a server cluster of at least two nodes linked together for communication by a communication mechanism, a method of communicating modification information to each of the nodes of the cluster, comprising: sending a request to replicate a transaction from a requester node to a locker node, the transaction including a plurality of local changes, performing the transaction at the locker node, receiving control at the requestor node from the locker node, performing the transaction at the requester node, replicating the transaction consistently in the cluster by requesting each other node in the cluster to perform the transaction and excluding from the cluster each other node that fails to commit the transaction, and informing the locker node that the operation is complete.

16. The method of claim 1 further comprising, queuing the permission request at the locker node until one or more prior transactions have completed replication, and upon completion of the replication of the one or more prior transactions, sending permission to replicate the transaction.

17. The system of claim 7 wherein the transaction includes information of at least two modifications.

18. The system of claim 17, further comprising, queuing the request for permission at the locker node until one or more prior transactions have completed replication, and upon completion of the replication of the one or more prior transactions, sending permission to replicate the transaction.

19. The method of claim 15 further comprising, queuing the request at the locker node until one or more prior transactions have completed replication, and upon completion of the replication of the one or more prior transactions, sending control to replicate the transaction.

* * * * *